(12) United States Patent
Pajukoski

(10) Patent No.: US 7,352,799 B2
(45) Date of Patent: Apr. 1, 2008

(54) CHANNEL ESTIMATION IN SPREAD SPECTRUM SYSTEM

(75) Inventor: Kari Pajukoski, Oulu (FI)

(73) Assignee: Nokia Corporation, Espoo (FI)

( * ) Notice: Subject to any disclaimer, the term of this patent is extended or adjusted under 35 U.S.C. 154(b) by 934 days.

(21) Appl. No.: 10/440,405

(22) Filed: May 19, 2003

(65) Prior Publication Data

US 2004/0017844 A1    Jan. 29, 2004

(30) Foreign Application Priority Data

May 21, 2002    (FI)    .................................. 20020953

(51) Int. Cl.
*H04B 1/707* (2006.01)
(52) U.S. Cl. ...................... 375/148; 375/347
(58) Field of Classification Search ................ 375/144, 375/148, 347
See application file for complete search history.

(56) References Cited

U.S. PATENT DOCUMENTS 6,118,832 A    9/2000    Maryargue et al.
2003/0053524 A1*    3/2003    Dent ........................... 375/148

FOREIGN PATENT DOCUMENTS

| EP | 0945995 | 9/1999 |
| EP | 1107468 | 5/2001 |
| WO | 98/19488 | 5/1998 |
| WO | WO 99/31820 | 6/1999 |
| WO | WO 00/21208 | 4/2000 |
| WO | WO 01/13530 A1 | 2/2001 |
| WO | WO 01/89109 | 11/2001 |

OTHER PUBLICATIONS

European Search Report dated Oct. 25, 2006.

* cited by examiner

*Primary Examiner*—Kevin Kim
(74) *Attorney, Agent, or Firm*—Squire, Sanders & Dempsey, LLP

(57) ABSTRACT

The invention relates to a receiver in a radio system, comprising two or more receiving antennas (300A-300B) for receiving a spread spectrum signal containing user signals, means for locating (200A-200B) delay components of the user signal at different measurement moments, means for forming (304) a combined correlation value from at least two correlation values of a certain delay component, the two correlation values being formed from signals received via different receiving antennas (300A-300B), and the estimation means (310) being configured to use the combined correlation value to correct channel distortion. The invention also relates to a method of receiving a signal.

18 Claims, 3 Drawing Sheets

CHANNEL ESTIMATION IN SPREAD SPECTRUM SYSTEM

BACKGROUND OF THE INVENTION

1. Field of the Invention

The invention relates to a method and an apparatus for receiving a spread spectrum signal.

2. Description of the Related Art

Formation of a channel estimate is one of the most central operations in user signal detection in a receiver of a radio system, for example in a WCDMA (Wideband Code Division Multiple Access) receiver. The advantage obtained from antenna diversity in reception via several receiving antennas may be lost because of errors made in channel estimation.

The channel estimation error is minimized when adaptive channel estimation is used in a receiver. Adaptiviness means that the channel estimator adapts to the power density spectrum of the radio channel, i.e. the Doppler distribution. Since the Doppler distribution may in practice be different for each multi-path propagated component, adaptation has to be performed in a component-specific manner.

A disadvantage associated with the prior art solution is that in a receiver which implements antenna diversity, a single multi-path propagated component contains a small amount of energy, which makes estimation of the Doppler distribution width difficult.

SUMMARY OF THE INVENTION

The object of the invention is to provide a method and an apparatus implementing the method to achieve improved reception of a user signal in a spread spectrum system.

This is achieved by a method of estimating a radio channel, the method comprising receiving a spread spectrum signal including user signals in a receiver of a radio system via at least two receiving antennas, forming channel estimates describing delay components of the user signal at different measurement moments and correlating channel coefficients of a certain delay component at different measurement moments with one another to form correlation values. The method comprises calculating a combined correlation value from at least two correlation values of a certain delay component in the receiver, the two correlation values being formed from signals received via different receiving antennas, and using the combined correlation values to correct channel distortion.

The invention also relates to a receiver in a radio system, comprising two or more receiving antennas for receiving a spread spectrum signal including user signals; means for locating delay components of the user signal at different measurement moments; and means for correlating channel coefficients of a certain delay component at different measurement moments with one another for forming correlation values. A Rake receiver comprises means for forming a combined correlation value from at least two correlation values of a certain delay component, the two correlation values being formed from signals received via different receiving antennas, and the estimation means being configured to use the combined correlation value formed in correction of channel distortion, and means for estimating the channel used for transmitting the user signal using the correlation values.

Preferred embodiments of the invention are disclosed in the dependent claims.

The invention is based on the use of signal components received via more than one antenna in channel estimation in a spread spectrum receiver in formation of the actual channel estimate, the components having propagation delays corresponding to each other. In connection with the invention, the correspondence to each other means that the signals received in different antennas are within one chip, i.e. the duration of one unit of a spreading code.

The method and system of the invention provide several advantages. The signal-to-noise ratio can be improved in signal reception since the Doppler distribution width can be estimated better in a receiver.

BRIEF DESCRIPTION OF THE DRAWINGS

The invention will now be described in greater detail by preferred embodiments, with reference to the accompanying drawings, in which.

DETAILED DESCRIPTION OF THE PREFERRED EMBODIMENTS

Figure 1:
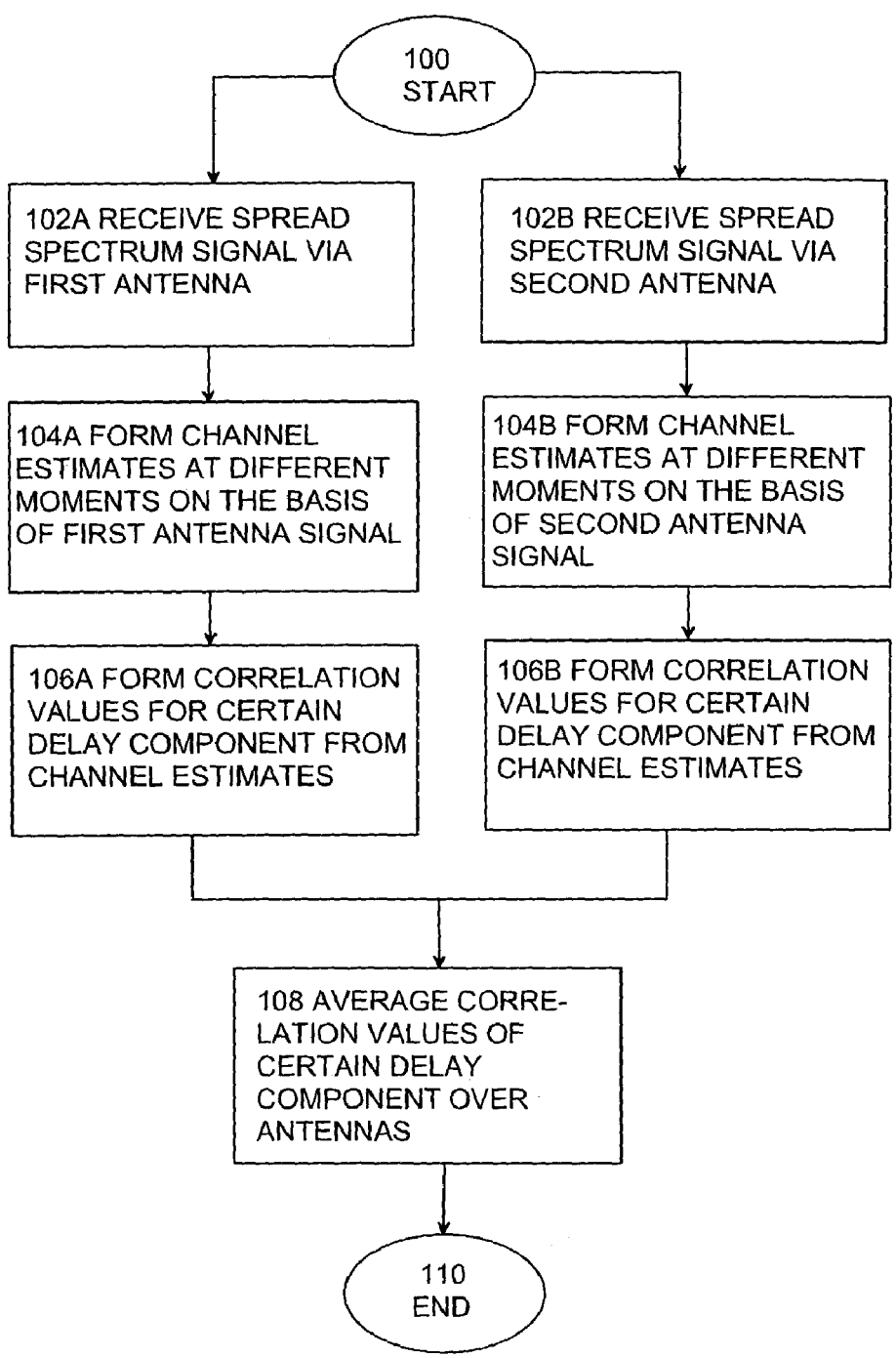
FIG. 1 illustrates a preferred embodiment of the method.

FIG. 1 illustrates a preferred embodiment of the method. In initial steps 102A-102B of the method, a spread spectrum signal is received in a radio system, which is e.g. a radio system in accordance with the WCDMA standard. The spread spectrum signal is received in the receiver of the radio system via at least two receiving antennas. Most preferably the receiver with multiple antennas is implemented in a base station of a radio system, but it can also be implemented in a terminal.

In method steps 104A-104B, channel estimates of the user signal are formed, i.e. antenna-specific impulse responses. A channel estimate can be formed, for example, by inserting a pilot signal spread using the user's channelization code into the received signal. When the pilot signal is synchronized with the received spread spectrum signal, an energy peak is formed in the channel estimate, the peak describing one multi-path propagated component of the user signal. The impulse response is formed at intervals of 5 ms, for example.

In method steps 106A-106B, correlation values are formed for certain delay components from the channel estimates. The correlation values are calculated according to the prior art employing formula (1), for example.

$$\hat{r}_{i,l,m} = E(\hat{a}_{k,l,m} \times \hat{a}^*_{k-i,l,m}), \qquad (1)$$

$\alpha_k$ is the estimated channel coefficient, E( ) means the expectation value, l is the index of the multi-path propagated path, m is the antenna index, i is the delay index. For example, if the receiver includes two antennas, m receives values 1-2. If the channel has four taps, i.e. there are four delay components in the impulse response, index l receives values from one to four. If the filter length N is 10, index i receives values 1-10. Assume that correlation values are calculated at moment 10. In that case, correlation values are formed for a certain delay component with delay components of all previous moments. For example, a correlation value corresponding to delay i=1 is formed for delay component l=2 between moments 10 and 9, a correlation value corresponding to delay i=2 is formed between moments 10 and 8, etc, and finally between moments 10 and 1.

Formula (2) presents how correlation values are averaged over the antennas according to method step 108.

$$\hat{r}_{i,l,m} = \frac{1}{M} \sum_{m=1}^{M} E(\hat{a}_{k,l,m} \times \hat{a}^*_{k-i,l,m}), \quad (2)$$

M means the number of antennas. Since the Doppler characteristics of signals with the same delay received via different antennas correspond to each other, correlation values can be formed by averaging over antennas. This provides the significant advantage that the Doppler spectrum of the channel can be described better than by following only one multi-path propagated path of the channel.

In the following, device solutions according to preferred embodiments will be described, before which the principles of a mobile communication system will be described in essence. In mobile communication systems, information is transmitted between a mobile communication network and a mobile station by data transmission resources. The data transmission resources of a mobile communication network are defined differently depending on the multiple access method of the system. In a system employing frequency division multiple access FDMA, users are separated from one another on the basis of the frequency used. In radio networks utilizing time division multiple access TDMA, several users may communicate on the same frequency band, on which the users are separated from one another temporally by dividing the information transmitted or received by the users into time slots. In a radio system employing code division multiple access CDMA, several transmitting and receiving stations communicate simultaneously on the same frequency band of the radio spectrum. A spreading code, by means of which the user spreads the information included in the base-band signal, is reserved for each user for the duration of connection. The receiver of the signal can detect the information transmitted by the user by despreading it with the corresponding despreading code. The radio system can also be implemented by combining multiple access methods, e.g. in a hybrid system based on TDMA and CDMA multiple access methods, users communicating in each time slot are separated from each other by spreading codes.

None of the multiple access methods described above guarantees an ideal and noise free radio link between the users and the mobile communication network. In a TDMA system, for example, users communicating in adjacent time slots and in adjacent cells of the mobile communication system interfere with each other. A disadvantage of the CDMA system is that users operating on the same frequency band cause interference for each other's transmissions due to the non-orthogonality of spreading codes and lack of synchronization between the transmitters. In addition to the interference users cause for each other, the topography of the surrounding terrain, for example, causes interference for the transmission of information on the radio path. Multi-path propagation means that when a user signal propagates, it is reflected from different objects, which produces several differently delayed components of the same signal in the receiver. The multi-path components of a signal may, for example, cause fading in a situation where a signal is reflected from two objects close to each other. When fading is significant, the signal cannot be received at all. Another radio system operating on a nearby frequency band or even on the same frequency band may also cause interference in the radio transmission, which results from the increase in the number of users and from the consequent enhanced utilization of frequency areas. Arrangement of second and third generation mobile communication networks on the same frequency band can be given as an example of solution of this kind. Receivers according to preferred embodiments will be described next. In a WCDMA radio system, for example, a rake receiver based on reception via one or more antennas is used in a base station. In a receiver of the rake-type, multi-path propagation can be utilized by receiving several differently delayed components, which are combined to obtain the best user signal detection. The rake receiver consists of correlators, which are called branches or fingers. Each branch correlates one multi-path propagated component, which yields a signal component corresponding to the component in question. Finally, the signal components obtained from different branches are combined into a user signal. A delay profile, i.e. impulse response, is typically formed for a radio channel for rake reception. The impulse response can be formed by means of a matched filter MF, for example. A matched filter is used on the pilot channel or on the information received in a pilot sequence of a radio burst. Pilot symbols consist of a set of symbols known to the receiver and the transmitter, in which case the receiver of information can form an estimate of the quality of the radio channel used since it knows what the received information should have included. The matched filter calculates convolution with the received signal and user code one spreading code chip at a time, for example, and measures the receiving power. Thus an impulse response pattern can be formed for the multi-path propagated components of the received radio channel, the pattern including information on the signal power and delays of the multi-path propagated components.

Figure 2:
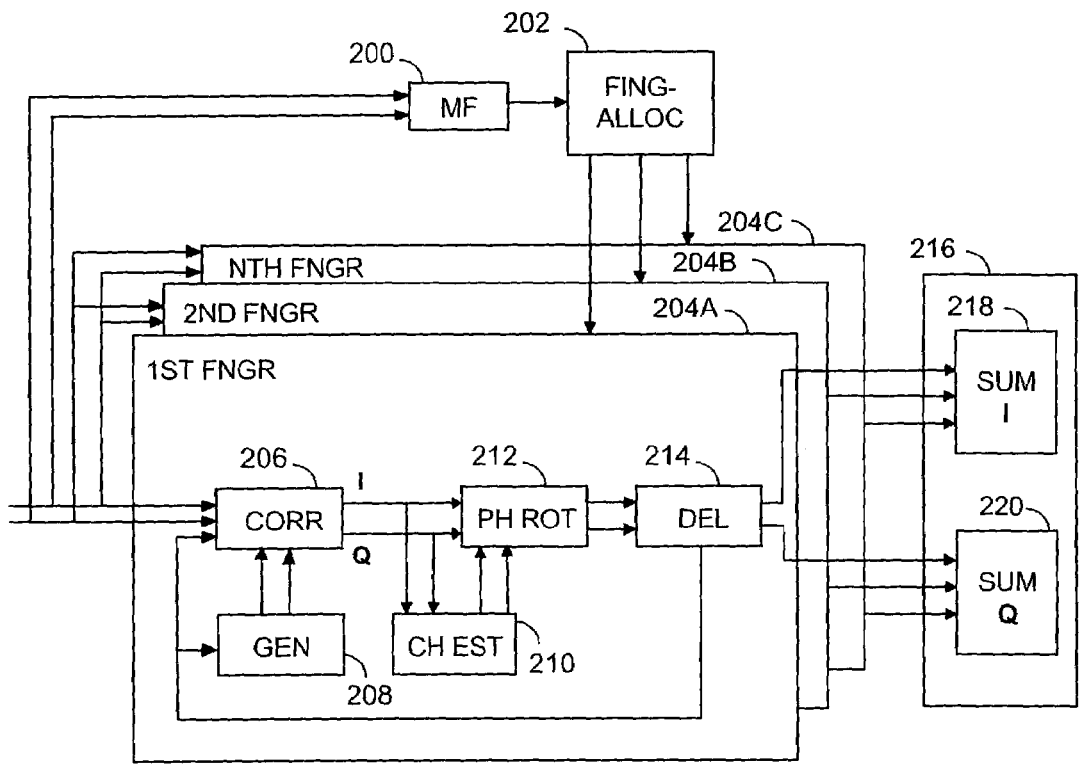
FIG. 2 illustrates a preferred embodiment of the apparatus, FIG. 3 specifies the receiver shown in FIG. 2.

FIG. 2 illustrates the basic principle of a rake receiver in respect of correlators and formation of user signal estimates. A conventional WCDMA receiver typically includes several fingers, i.e. branches, each of which is responsible for monitoring one multi-path propagated component of the received user signal. Due to the mobile nature of a mobile station, the propagation environment between the base station and the mobile station varies constantly and thus the level and number of multi-path propagated signals also change with the location of the mobile station. In the receiver, a signal is received by one or more antenna receivers and transmitted, after radio frequency parts, to an analogue/digital converter, from which signals modulated e.g. by QPSK modulation are obtained with separated l and Q branches. Multi-path propagated components are searched for the signal sampled in the A/D converter in a search branch. Formation of the impulse response of the branch is implemented by means of a matched filter 200. In the connection establishment stage, a correlator 200 provided in the search branch tries to synchronize with the pilot bits spread with the spreading code to form an impulse response. A relatively long matched filter 200 is used on the signal to be received in the search branch so that the correct phase of the spreading code could be found as quickly as possible.

The search branch also includes allocation means 202, which determine the delays of different components from the impulse response formed in the matched filter 200 and allocate the components for monitoring by the fingers 204A-204C of the rake receiver. The allocation means 202 detect the strongest multi-path components in the channel impulse response and reallocate the finger branches 204A-204C if multi-path components stronger than the old multi-path components were found in the channel impulse response. The re-allocation of the finger branches 204A-204C can also be performed at regular intervals.

Each finger 204A-204C includes a correlator 206 and a code generator 208 for editing one multi-path propagated component. The channel estimator 210 utilizes pilot symbols to estimate the channel state. Any channel influence can be eliminated from received symbols by a phase rotator 212. The signal delay is corrected by a delay unit 214, in which case signals received in different branches can be phased with each other. A combiner 216 of the rake receiver combines signals received in different branches 204A-204C to obtain multi-path diversity against channel fading. Signals of the I branch are combined in adder 218, and signals of the Q branch in adder 220. In a typical rake receiver, processing at the chip level, such as correlators, code generators and matched filters, is implemented as ASIC (Application Specific Integrated Circuit), whereas symbol-level processing, such as channel estimation, phase rotation and combination, is implemented as DSP (Digital Signal Processing).

Figure 3:
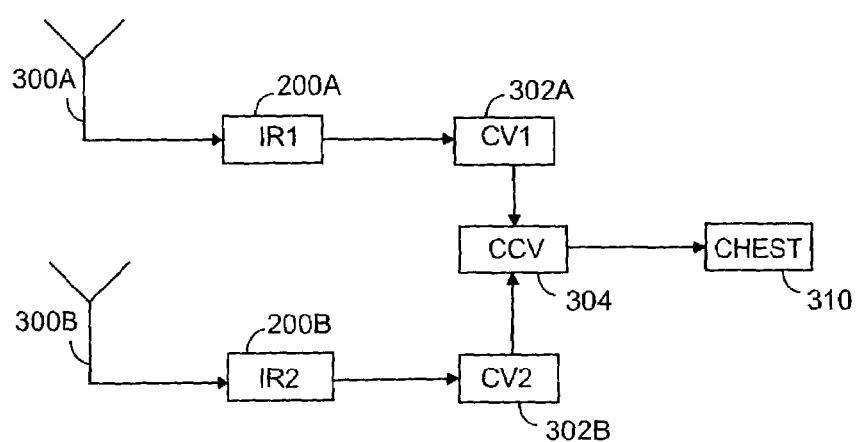

FIG. 3 illustrates a receiver according to a preferred embodiment with main emphasis on the implementation of the channel estimator. A spread spectrum signal including user signals is received in a rake receiver via at least two receiving antennas 300A-300B. Impulse response of the user signal is formed in the means for synchronizing the user signal, for example periodically and in an antenna-specific manner in matched filters 200A-200B. Signals received via two or more antennas are preferably guided to the same channel estimator 210. The calculation means 302A-302B for correlation values form correlation values for delay components on the basis of the outputs of the matched filters. The calculation means utilize a certain number of impulse response measurements. If the number of measurements is 15, for example, a vector whose length is 15 is maintained in the calculation means. For example, at moment 15 correlation values [(1,15);(2,15); ... (14,15)] are formed for the vector, when index 1 means a moment earlier than moment 15. At moment 16, the vector is moved forward by one step, and correlation values [(2,16);(3,16); . . . (15,16)] are formed. The rake receiver further comprises calculation means 304 for a combined correlation where correlation values based on signals received via different antennas are combined. A combined correlation value is formed for the above-mentioned moment 16, for example, the combined correlation being formed by means of the correlation value (3,16) of the first antenna and the corresponding correlation value (3,16) of the second antenna. Preferably the combined correlation value is formed as an average of individual correlation values. Processing continues this way until a combined correlation value vector has been formed which is in practice as long as the original correlation vectors.

Combined correlation values are preferably utilized in the channel estimator 310 in the receiver by evaluating how much pilot symbols correlate with each other. Based on this, the influence of channel distortion can be eliminated from the data parts of the received signal. The signal from which channel distortion has been eliminated is guided to further processing in the receiver, e.g. to channel decoding/deinterleaving means. By means of the method, the width of the Doppler spectrum can be found out with a good accuracy, and the spectrum information can preferably also be utilized to find out the terminal speed. The speed can be determined by calculating Fourier transformation of the correlation function, for instance.

Figure 4:
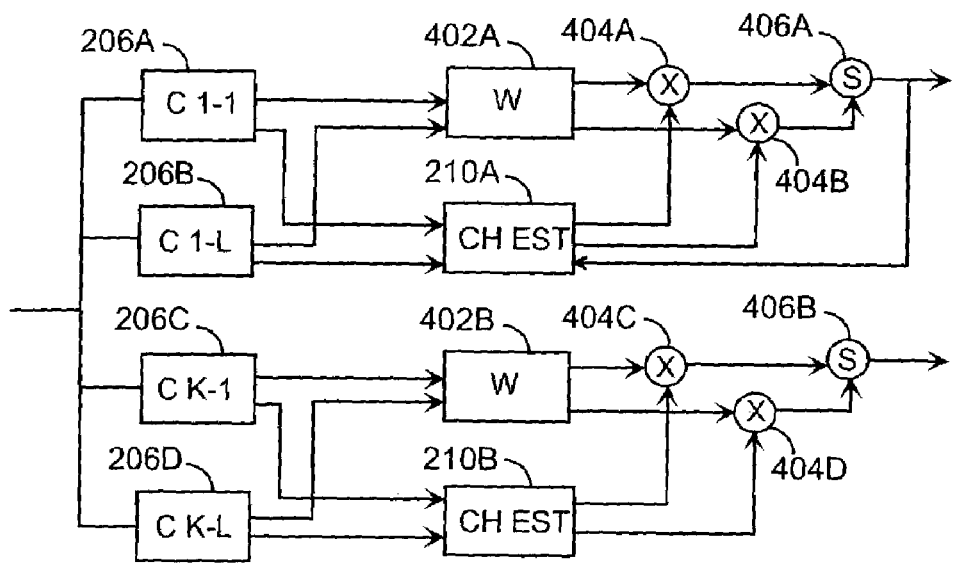
FIG. 4 illustrates a preferred embodiment of the receiver.

FIG. 4 illustrates a preferred embodiment of the receiver in respect of parts relevant to the invention. The received signal is guided to correlators 206A-206D. The user's first combined multi-path component is obtained as the output of correlator 206A. Correspondingly, the user's Lth multi-path component is obtained as the output of correlator 206B. Correspondingly, the first and Lth multi-path components of the Kth user are received as outputs from correlators 206C and 206D. Different multi-path components can be combined by the MRC (Maximum ratio Combining) method, for example. The channel estimators 210A-210B form a complex channel coefficient from the signal. The coefficient gives the amplitude and phase distortion caused for the signal transmitted by the radio channel used. For the output of the signal received in the input, the channel estimation means 210A form a complex channel coefficient, which is guided together with a weighting coefficient from weighting means 402A, 402B to multipliers 404A to 404D. A symbol estimate which can be provided with feedback to channel estimation is obtained as the output of adders 406A, 406B.

Figure 5:
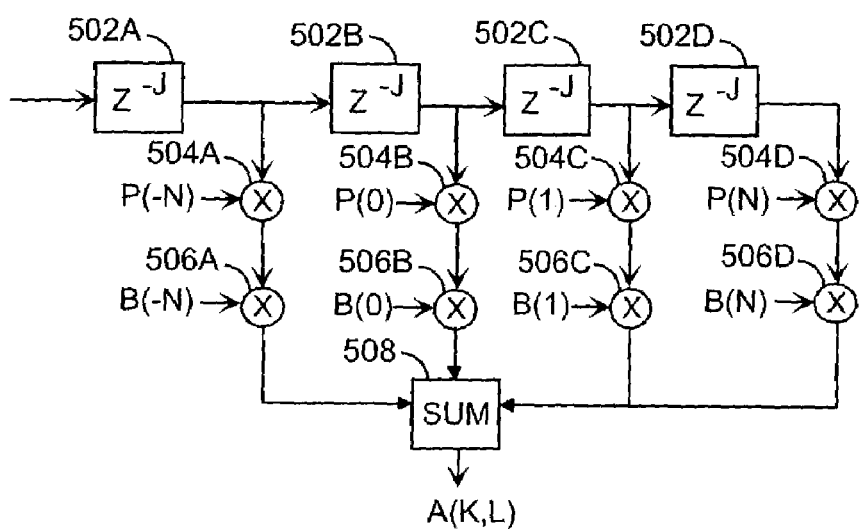
FIG. 5 illustrates implementation of a channel estimator in the receiver.

FIG. 5 further illustrates implementation of channel estimation in a receiver. A combined signal is obtained as the input for the channel estimation means. The channel estimator includes delaying means 502A-502D, by means of which the input signal is delayed for the duration of the pilot symbol. For example, in addition to the signal, P(−N), where P means the pilot sequence and −N the first symbol of the pilot sequence, is taken as the input to multiplier block 504A. In addition to the input signal, pilot symbol 0 is taken as input to multiplier block 504B, pilot symbol 1 to multiplier block 504C and pilot symbol N to multiplier block 504D. In addition to the input signal, weighting coefficient B is also taken to multiplier block 506A. The delaying blocks 502A-502D thus move the input signal forward a pilot symbol at a time, and after the signal has been moved by a pilot signal, the input signal is multiplied by the complex conjugates of the pilot symbols P(−N)−P(N). The signal multiplied by the pilot symbols is weighted by weighting coefficients, i.e. channel filter coefficients B(−N)−B(N) in blocks 506A-506D. The resulting signal is added in an adder 508, which yields channel coefficient A(K,L) as its output.

In the following, it will be shown how parameters of the channel estimation filter, such as filter length and coefficients used, depend on correlation values. In an embodiment, the filter is an averaging filter whose all coefficients P are the same. In that case, the filter length N is a parameter which can be controlled by correlation values, i.e. if the filter shown in FIG. 5 is lengthened, N will be increased, and vice versa. One example could be a situation where the terminal moves at the walking speed. In that case, the radio channel changes slowly, and there is a high correlation value between delays 10 and 1, for example. When there is a significant correlation between distant delays in this case, a considerably long filter can be employed since the longer the filter, the better noise properties will be achieved. If the terminal moves at a speed of 120 km/h, for example, the correlation between delays 5 and 1, for example, may be close to zero. In that case, a signal delayed by five or more samples is no longer usable for channel estimation but the filter can be used only over a few samples.

According to another embodiment, a filter with a fixed length is used. In that case, the filter operation can be controlled by changing the filter coefficients on the basis of correlation values. For example, if the correlation of distant samples starts to weaken, the samples can be included in the analyzation but their weighting value is reduced. The signal-to-noise ratio (SNR) can also be utilized in parameterization of the channel estimation filter. The signal-to-noise ratio is employed as follows, for example: the worse the SNR; the longer the filter used. On the other hand, when the SNR is high enough, channel estimation filtering is not needed at all.

The invention is implemented in the receiver preferably by software, as ASIC (Application Specific Integrated Circuit), by separate logic components or in another corresponding manner.

Even though the invention was described above with reference to the example according to the drawings, it is clear that the invention is not limited thereto but may be modified in various ways within the scope of the inventive concept disclosed in the appended claims.

The invention claimed is:

1. A method of estimating a radio channel in a radio system, comprising:
   processing a spread spectrum signal containing user signals and received in a receiver of the radio system via at least two receiving antennas;
   forming channel estimates which describe delay components of the user signal at different measurement moments;
   correlating channel coefficients of a certain delay component at different measurement moments with each other to form correlation values, calculating, to correct the channel distortion, a combined correlation value from at least two correlation values of a certain delay component in the receiver, the correlation values being formed from signals received via different receiving antennas; and
   using the correlation values in correcting channel distortion, wherein the combined correlation value is calculated by averaging the correlation values of a certain delay component that correspond to each other over two or more receiving antennas.

2. A method of estimating a radio channel in a radio system, comprising:
   processing a spread spectrum signal containing user signals and received in a receiver of the radio system via at least two receiving antennas;
   forming channel estimates which describe delay components of the user signal at different measurement moments;
   correlating channel coefficients of a certain delay component at different measurement moments with each other to form correlation values, calculating, to correct the channel distortion, a combined correlation value from at least two correlation values of a certain delay component in the receiver, the correlation values being formed from signals received via different receiving antennas; and
   using the correlation values in correcting channel distortion, wherein the combined correlation value is used in determining parameters of the channel estimation filter.

3. A method according to claim 2, wherein the parameter of the channel estimation filter to be determined is the length of the channel estimation filter.

4. A method according to claim 2, wherein the parameter of the channel estimation filter to be determined is the coefficient of the channel estimation filter.

5. A method according to claim 4, wherein the coefficients of the channel estimation filter are calculated by means of the combined correlation values and noise power measured from the received spread spectrum signal.

6. A method according to claim 3, wherein the length of the channel estimation filter is calculated by means of the combined correlation values and noise power measured from the received spread spectrum signal.

7. A method of estimating a radio channel in a radio system, comprising:
   processing a spread spectrum signal containing user signals and received in a receiver of the radio system via at least two receiving antennas;
   forming channel estimates which describe delay components of the user signal at different measurement moments;
   correlating channel coefficients of a certain delay component at different measurement moments with each other to form correlation values, calculating, to correct the channel distortion, a combined correlation value from at least two correlation values of a certain delay component in the receiver, the correlation values being formed from signals received via different receiving antennas; and
   using the correlation values in correcting channel distortion, wherein the width of the Doppler spectrum of the user signal is determined on the basis of the combined correlation values formed, and the speed of the terminal that formed the user signal is estimated on the basis of the Doppler spectrum width.

8. A method of estimating a radio channel in a radio system, comprising:
   processing a spread spectrum signal containing user signals and received in a receiver of the radio system via at least two receiving antennas;
   forming channel estimates which describe delay components of the user signal at different measurement moments;
   correlating channel coefficients of a certain delay component at different measurement moments with each other to form correlation values, calculating, to correct the channel distortion, a combined correlation value from at least two correlation values of a certain delay component in the receiver, the correlation values being formed from signals received via different receiving antennas; and
   using the correlation values in correcting channel distortion, wherein the combined correlation value is calculated from signals received via two or more receiving antennas, the temporal difference between the signals being at most one chip of the spread code used in the formation of the spread spectrum signal.

9. A module of a radio receiver in a radio system comprising:
   a processing device configured to process for receiving a spread spectrum signal received via two or more receiving antennas and including user signals;
   a locating device configured to locate delay components of the user signal at different measurement moments;
   a correlating device configured to correlate channel coefficients of a certain delay component at different measurement moments with one another to form correlation values;
   a correlation value forming device configured to form a combined correlation value from at least two correlation values of a certain delay component, the two correlation values being formed from signals received via different receiving antennas; and an estimating device configured to use the combined correlation value formed to correct channel distortion and configured to estimate the channel used to transmit the user signal using the correlation values, wherein the correlation value forming device is configured to form the combined correlation value by averaging the correlation values of a certain delay component that correspond to each other over two or more receiving antennas.

10. A module of a radio receiver in a radio system comprising:
   a processing device configured to process for receiving a spread spectrum signal received via two or more receiving antennas and including user signals;
   a locating device configured to locate delay components of the user signal at different measurement moments;
   a correlating device configured to correlate channel coefficients of a certain delay component at different measurement moments with one another to form correlation values;
   a correlation value forming device configured to form a combined correlation value from at least two correlation values of a certain delay component, the two correlation values being formed from signals received via different receiving antennas; and
   an estimating device configured to use the combined correlation value formed to correct channel distortion and configured to estimate the channel used to transmit the user signal using the correlation values, wherein the estimation device is a channel estimation filter and the receiver is configured to use the combined correlation value in determining parameters of the channel estimation filter.

11. A receiver according to claim 10, wherein the parameter of the channel estimation filter to be determined is the length of the channel estimation filter.

12. A receiver according to claim 11, wherein the receiver is configured to determine the length of the channel estimation filter using the combined correlation values and noise power of the received spread spectrum signal.

13. A receiver according to claim 10, wherein the parameter of the channel estimation filter to be determined is the coefficient of the channel estimation filter.

14. A receiver according to claim 13, wherein the receiver comprises measuring device configured to measure the noise level from the received signal and the receiver is configured to determine the coefficients of the channel estimation filter through combined correlation values and noise power of the received spread spectrum signal.

15. A receiver according to claim 10, wherein the receiver is configured to determine the width of the Doppler spectrum of the user signal on the basis of the combined correlation values formed, and
   the speed of the terminal that formed the user signal is estimated on the basis of the Doppler spectrum width.

16. A receiver according to claim 10, wherein the correlation value forming device is configured to form the combined correlation value from signals received via two or more receiving antennas, the temporal difference between the signals being at most one chip of the spreading code used to form the spread spectrum signal.

17. A module of a radio receiver in a radio system comprising:
   processing means for processing a spread spectrum signal received via two or more receiving antennas and including user signals;
   means for locating delay components of the user signal at different measurement moments;
   means for correlating channel coefficients of a certain delay component at different measurement moments with one another to form correlation values;
   means for forming a combined correlation value from at least two correlation values of a certain delay component, the two correlation values being formed from signals received via different receiving antennas;
   means for using the combined correlation value formed to correct channel distortion; and
   means for estimating the channel used for transmitting the user signal using the correlation values, wherein the means for forming the combined correlation value forms the combined correlation value by averaging the correlation values of a certain delay component that correspond to each other over two or more receiving antennas.

18. A module of a radio receiver in a radio system comprising:
   processing means for processing a spread spectrum signal received via two or more receiving antennas and including user signals;
   means for locating delay components of the user signal at different measurement moments;
   means for correlating channel coefficients of a certain delay component at different measurement moments with one another to form correlation values;
   means for forming a combined correlation value from at least two correlation values of a certain delay component, the two correlation values being formed from signals received via different receiving antennas;
   means for using the combined correlation value formed to correct channel distortion; and
   means for estimating the channel used for transmitting the user signal using the correlation values, wherein the means for estimating is a channel estimation filter and the receiver use the combined correlation value in determining parameters of the channel estimation filter.

* * * * *